United States Patent [19]
Seiffert et al.

[11] Patent Number: 5,729,472
[45] Date of Patent: Mar. 17, 1998

[54] MONITORING ARCHITECTURE

[75] Inventors: Roland Seiffert, Morgan Hill; Stan Wong, San Jose, both of Calif.

[73] Assignee: International Business Machines Corporation, Armonk, N.Y.

[21] Appl. No.: 650,903

[22] Filed: May 17, 1996

[51] Int. Cl.$^6$ .................................................. H04L 12/26
[52] U.S. Cl. ................................. 364/550; 395/200.11
[58] Field of Search ........................... 364/550, 551.01; 395/200.11, 182.02, 183.01; 370/229, 235

[56] References Cited

U.S. PATENT DOCUMENTS

| | | | |
|---|---|---|---|
| 5,495,607 | 2/1996 | Pisello et al. | 396/600 |
| 5,649,185 | 7/1997 | Antognini et al. | |
| 5,651,006 | 7/1997 | Fujino et al. | 370/408 |
| 5,655,081 | 8/1997 | Bonnell et al. | 395/200.32 |

OTHER PUBLICATIONS

Oliveira, "Intelligent Agents: A Way to Reduce the Gap Between Applications and Networks", IEEE, May 1995.
Hurwicz, "Management Gets an Agent", LAN Magazine, Sep. 1995.

Primary Examiner—James P. Trammell
Assistant Examiner—Patrick Assouad
Attorney, Agent, or Firm—Sughrue, Mion, Zinn, Macpeak & Seas, PLLC

[57] ABSTRACT

A method and apparatus of monitoring a computer system having two or more managed systems, by utilizing an optimized distributed policies or rules evaluation knowledge-base. The computer systems includes a subsystem designated as the central point of control and one or more subsystems designated as managed systems. Each of the subsystems include a monitoring agent that is fully-automated and optimized to improve performance of the computer system. A monitoring agent includes watchdog agents, rule evaluator modules and action modules for monitoring various characteristics of the computer system. The monitoring agents are optimized by evaluating policies or rules locally when possible and globally when required.

17 Claims, 3 Drawing Sheets

MONITORING ARCHITECTURE

BACKGROUND OF THE INVENTION

The present invention is directed to a method and apparatus of monitoring a plurality of managed systems, utilizing an optimized distributed policies or rules evaluation knowledge-base. More particularly, the present invention is directed to a fully-automated method and apparatus of monitoring a plurality of remotely located managed systems by evaluating policies or rules locally when possible and globally when required.

Complex computer systems of the type known in the art are generally constituted by several subsystems, which include, for example, various types of computer networks, computer workstations and/or mainframes, each running its own operating system and application and database software. It is also known that such complex systems require at least one individual, referred to as the system administrator, to control and manage the computer system including each of the subsystems on a daily basis, to ensure the efficient and smooth operation of the system. As computer systems become larger and more complex, they tend to require even more attention and time to ensure proper operation.

The management of such complex computer systems includes both online administrative tasks and offline monitoring tasks. These tasks include initializing or configuring the computer system's operating system, databases and other applications present on the computer system. As an example, online administrative tasks include initializing a new user's account, such as the user identification (userid) and password, allocating additional storage space for existing databases or other types of applications, installing new applications onto the computer system, and so on. Offline monitoring tasks include, for example, observing the number of user's logon'd to the computer system, or the CPU utilization or storage space available at any given moment. There are, of course, many other administrative and monitoring tasks that a system administrative is required to perform—all of which are known and within the skill of the ordinary artisan.

Oftentimes, the subsystems which constitute a computer system are physically located at the same site (e.g., within the same office building). In this case, it is not uncommon to have one system administrator manage and control the computer system. More commonly today, however, subsystems are not located at the same site, but are variously situated at different locations, including, in some instances, different cities or even states. A bank, for example, having a number of branch offices may have a computer subsystem located at the bank's headquarters and variously throughout a state at each of the branch offices. Ideally there is a system administrator located on site for each of the subsystems. However, this proves to be quite expensive. On the other hand, as an alternative, there may be only one system administrator for the entire computer system. The system administrator would have to travel from one site to the next in order to carry out his/her functions. This is also disadvantageous as it requires a substantial amount of time to travel between different locations, significantly reducing the amount of time the system administrator has to spend with each system. Moreover, when users of the computer system require immediate assistance, they must often wait until the system administrator is able to travel to the site and attend to the problem. This is not acceptable.

To overcome these and other problems associated with computer systems as described above, a control system has been developed. The control system allows a system administrator to manage (i.e., perform the administrative and monitoring tasks) a computer system, including its many subsystems systems variously located, from one central site. In such a case, the central site includes a workstation that is capable of communicating with each of the subsystems systems via a communication link, allowing the system administrator to perform both the online administrative tasks and offline monitoring tasks, as if he/she were physically located at the remote location.

As part of the monitoring tasks, the system administrative has the ability to monitor various types of parameters from the central site. For example, the system administrator may wish to monitor the amount of storage space available at each of the managed systems. To do so, a command is issued from the central site to the managed system, with an instruction to monitor the storage space available and to send the results back to the central site for evaluation and analysis, on a timed basis, such as every 10 or 15 minutes. The central site compares the result (e.g., the amount of storage space available) to a preset threshold, and acts accordingly. For example, if the amount of storage space available is less than a preset threshold, the system will notify the system administrative through some sort of an alarm. The system administrator may then take the steps necessary to avoid any problem.

Such a system, however, has many drawbacks. First, the control system as described above, requires all of the monitoring information to be communicated from the subsystem to the control site. This places a heavy burden on the communication links, and drastically reduces the bandwidth of the link that would otherwise be available. Secondly, there is an extremely high demand on the central site to process and analyze all of the monitoring information, and then to execute the actions based on the results of the analysis. Thus, a large portion of the CPU utilization of the central site's computer system is dedicated to handling offline monitoring tasks. In certain configurations, for example, where there is a relatively large number of subsystems to monitor, the number of monitoring tasks become so numerous that the central site quickly becomes overburdened and unable to handle all of the monitoring tasks or any other functions that it is designed to carry out. Lastly, if the central site becomes disconnected from the subsystems because of a failure, the monitoring of the subsystems ceases immediately. Thus, because of a single point of failure, the subsystems are left unmonitored, and this is unacceptable.

There is also known a control system in which all of the monitoring is performed locally at the site of the subsystems. Such a system should be contrasted with a global monitoring system as described above. Unlike the global monitoring system, the local monitoring system has more autonomy, because each of the subsystems monitors itself, reporting merely results to the central site. The central site performs no role in the monitoring and evaluation of the remote subsystem. While the local monitoring system avoids certain drawbacks associated with the global monitoring system, the localized monitoring system is susceptible to many others. For example, the localized monitoring system has no way of monitoring operations relative to another subsystem, and thus it cannot correlate activities from multiple hosts or other remote systems. Therefore, the monitoring functions employed are rather primitive as they contain just the monitoring information of the localized system. In addition, an extremely heavy burden is placed on each of the subsystems to carry out the monitoring tasks, taking away valuable computer resources for the applications designed to be carried out at the local system. Accordingly, the localized monitoring system is not an acceptable alternative to the global monitoring system.

SUMMARY OF THE INVENTION

Accordingly, it is a general object of the present invention to provide an optimized distributed policy or rule evaluation monitoring system for a computer system, which is free of the above and other problems of the related art.

Another object of the present invention is to provide an optimized distributed monitoring system which is fully automated, passive and transparent to the user, to evaluate policies and rules locally at the central site when possible, and at the remote site when required.

Yet another object of the present invention is to provide an optimized distributed monitoring method and apparatus to determine whether a rule can be evaluated locally through analysis of the rule's contents. If all the required information to analyze the rule is available locally, the rules evaluation is done at the immediate site where the data collection occurs. If the rule requires data from multiple subsystems, the rule is automatically forwarded to a central location for evaluation.

A further object of the present invention to provide an optimized monitoring method and apparatus in which the amount of network traffic is reduced to allow the monitored system to run while disconnected from the central, management application and to provide quicker response when necessary.

It is a further object of the present invention to provide a fully automated rules evaluation method and apparatus which optimizes the location at which the rules are evaluated. A system administrator can alter the location where the rule is evaluated by changing the data needed to evaluate the rule. In accordance with the present invention, the optimal evaluation location is decided based on the location of the data needed to perform the evaluation, and this decision is performed transparently to the system administrator.

The above and other objects of the present invention are accomplished by providing a method of monitoring a computer system having a plurality of subsystems, in which one of the subsystems is defined as a central subsystem and another one of the subsystems is defined as a managed subsystem. The method includes the steps of defining a set of watchdog checks for monitoring the subsystems, defining one or more watchdog rules for evaluating at least one of the watchdog checks, each rule being based on a predetermined algorithm, and optimizing the processing of the watchdog rules based on the subsystems monitored by the watchdog checks which are evaluated by each of the watchdog rules.

The above and other objects of the present invention are further accomplished by providing an apparatus for monitoring a computer system having a central subsystem and at least first and second remote subsystems. The apparatus includes an interface unit for defining a plurality of watchdog checks to monitor one of the subsystems, and for defining a set of watchdog rules for evaluating a set of conditions against one or more of the plurality of watchdog rules, and an infobase agent, coupled to the interface unit, for receiving and processing the plurality of watchdog checks and the set of watchdog rules, the infobase agent being operative to transfer each of the plurality of watchdog checks to the subsystem the watchdog check is defined to monitor, and to distribute each of the watchdog rules to one of the subsystems, based on the location of the watchdog checks which are evaluated by the watchdog rule.

DETAILED DESCRIPTION OF PREFERRED EMBODIMENTS OF THE INVENTION

Figure 1:
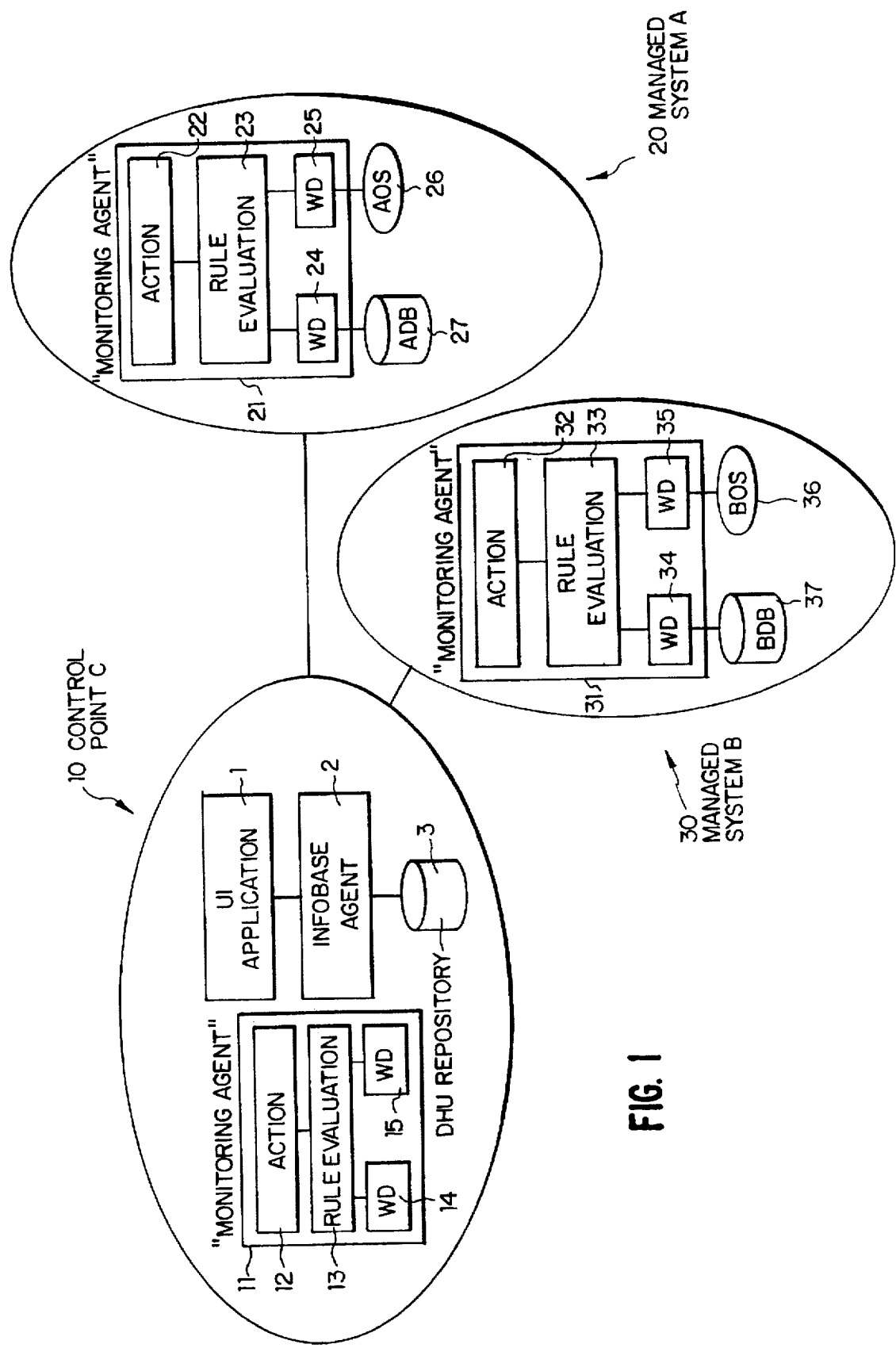
FIG. 1 illustrates a computer system in accordance with a preferred embodiment of the present invention.

In accordance with the present invention, FIG. 1 illustrates a computer system 100 having subsystems 10, 20, and 30. It should be noted that the number of subsystems shown is for the sake of illustration. The number of subsystems will vary, of course, ranging from a few (e.g., two to five) to perhaps several hundreds of subsystems, depending on the specific design of the computer system 100.

As illustrated in FIG. 1, one of the subsystems is defined as the control point, while the remaining subsystems are defined as managed systems. In accordance with the preferred embodiment, the subsystem 10 is defined as control point C and subsystems 20, 30 are defined as Managed Subsystem A and Managed Subsystem B, respectively. It should be noted that the determination of which subsystem is the control point and which subsystems are the managed systems is based in part on the processing power available at each of the subsystems. That is, the subsystem 20 could be configured as the control point and the subsystem 10 could be configured as a managed system. The determination of which subsystem serves as the control point is one of design, based on resources available and other conveniences.

The subsystem 10 at control point C includes a user interface 1, an infobase agent 2, and a database repository 3. The user interface 1 is constituted by a workstation having, as an example, a keyboard and graphical interface (not shown) for allowing the user of the system to interact with the system. As explained more fully below, the user interface 1 is the point at which the user or system administrator is able to administer and monitor the computer system 100, including the subsystem 10 at control point C and each of the managed systems 20, 30. The infobase agent 2 is coupled to the user interface 1. The infobase agent is operative to receive and process commands entered into the system by the system administrator. As explained below more fully, the infobase agent 2 directs commands via messages to the various managed systems. Lastly, the database repository 3 stores pertinent information concerning the computer system 100 as a whole. For example, the repository stores data relating to the topology of the complete computer system, as well as information concerning the types of operating systems, databases, and other applications existing on each of the subsystems 10, 20, 30. The repository further stores information pertaining the offline monitoring of the computer system, in accordance with the present invention.

The subsystem 10 at control point C further includes, like all of the subsystems, a monitoring agent 11. The monitoring agent 11 includes an action agent 12, a rule evaluator module 13, and watchdog agents 14, 15. In a known manner, the control point 10 is coupled to each of the managed systems 20, 30 through communication links 4, 5, which may be constituted by non-dedicated or dedicated telephone lines or communication links having an even higher bandwidth. The communication links 4, 5 provide a mechanism for the control point 10 to communicate with each of the managed systems, in order to carry out, among others, the administrative and monitoring tasks.

The subsystem 20 at Managed System A includes, as examples, an operating system AOS 26 and database ADB 27. As is known in the art, all computer systems require some sort of operating system (e.g., UNIX) to initialize, configure and control the computer system. The database ADB 27 is one type of application that resides on the subsystem 20. As is well-known in the art, a database is constituted by a collection of data with a given structure for accepting, storing, and providing data in various forms for multiple users on demand. In a typical setting, the subsystem 20 at Managed System A would have additional applications available. The subsystem 20 further includes a monitoring agent 21. Like the monitoring agent 11, the monitoring agent 21 includes an action agent 22, a rule evaluator module 23, and watchdog agents 24, 25.

The subsystem 30 at Managed System B is configured similarly to the subsystem 20. Specifically, the subsystem 30 includes an operating system BOS 36 and database BDB 37. According to the present invention, the operating system 36 residing on subsystem 30 need not be the same as or even similar to the operating system 26 that resides on subsystem 20. The same is true for the databases ADB 27 and BDB 37, or any other types of applications which operate on the subsystem 20.

The subsystem 30 further includes a monitoring agent 31 which is constituted by the same components as the monitoring agents 11 and 21, as described above. Thus, the monitoring agent 31 includes an action agent 32, a rule evaluator module 33, and watchdog agents 34, 35.

In accordance with the present invention, the monitoring agents 11 and 21, 31 provide the system administrator the ability to monitor the computer system 100, including the subsystem 10 at control point (3 and each of the subsystems 20, 30 at Managed Systems A and B through the use of watchdogs. A watchdog, sometimes referred to as an intelligent agent, is a process, which operates on one of the watchdog agents, for providing offline monitoring of the operating systems, databases, and other applications. A watchdog is specific to run-time environments (operating systems and databases). For example, a UNIX operating system is monitored by an operating system watchdog specific to UNIX. The system administrator, via the user interface 1 and infobase agent 2, programs the watchdog agents with one or more conditions to monitor (referred to as watchdog checks). The watchdog check has the following components: filter values, scheduling information, the command to execute, and instructions on whether or not to store the check values.

In addition, the system administrator programs the rule evaluator modules 13, 23, 33, via the user interface 1 and infobase agent 2, with one or more watchdog rules. A, watchdog rule is a condition or set of conditions evaluated-based on the values returned by one or more watchdog checks. Each of the watchdog rules defines acceptable limits for the condition or conditions and specifies an action to be taken if the conditions are met. The action(s) specified by the rule evaluator is carried out by at least one of the action agents 12, 22, 32.

In operation, administration and monitoring of the computer system, including both of the subsystems 20, 30, as illustrated in FIG. 1 and described above, are performed by the system administrator on the subsystem 10 at the control point C. According to one feature of the present invention, the system administrator need not be physically located at either Managed System A or Managed System B.

The system administrator has the ability to perform administrative tasks on-line via the user interface 1. More specifically, via the user interface 1, the system administrator enters commands through the selection of icons by a pointing device and a keyboard (not shown) in order to execute administrative tasks for each of the subsystems 10, 20, 30. Thus, for example, the system administrator can perform administrative tasks on the subsystem at Managed System A from the remote subsystem 10 located at the control point C.

The system administrator further has the ability to monitor not only the computer system as a whole, but each of the individual subsystems, such as those located at the Managed Systems A and B sites and the subsystem 10 at the control point C. The monitoring functions are all defined via the user interface 1, as will now be described in detail.

More specifically, the system administrator defines one or more watchdog checks by entering appropriate commands by selecting an icon with a pointing device or through a keyboard of the user interface 1. Once a watchdog check is defined by the system administrator, it is passed to the infobase agent 2 and stored in the data repository 3. The infobase agent 2 determines automatically the subsystem which should receive the newly defined watchdog check. This decision is based on which entity is being monitored. For example, if the database ADB 27 is being monitored, the watchdog check will be transferred to the watchdog agent 24. The watchdog check is then transferred to the appropriate subsystem by sending a message to that subsystem over a communication link. At the subsystem receiving the watchdog check, the watchdog agent is configured to begin execution of the watchdog check.

Next, the system administrator may define one or more watchdog rules, each of which evaluates one or more watchdog check values against a condition or set of conditions, and then initiates an action if the condition or set of conditions is satisfied. The system administrator also defines the action that is to be performed once the condition or set of conditions is satisfied.

Once a rule is defined by the system administrator, the user interface 1 transfers the rule to the infobase agent 2 for processing and updates the data repository 3 to add the newly defined rule. Next, the infobase agent 2 analyzes the newly defined rule and locates all of the watchdog checks which the rule is based. If all of the watchdog checks are located within the same subsystem, the rule is qualified as being local. For instance, if the rule defined by the system administrator is based on watchdog checks of the database ADB 27 and operating system AOS 26, then the watchdog rule is deemed local to the subsystem 20 at Managed System A.

On the other hand, if the rule is based on watchdog checks which are not located at the same subsystem, the rule is qualified as being global and passed to a global rule evaluator module for evaluation. For example, if a rule defined by the system administrator is based on watchdog checks of the database ADB 27 at the subsystem 20 and the database BDB 37 at the subsystem 30, then the rule is deemed global. That is, the watchdog checks are not local to one subsystem. Therefore, the global rule will be passed to the global rule evaluator.

If the rule is local, the rule is transferred to the subsystem at which the watchdog check or checks is being executed. The watchdog check values are transferred to the local rule evaluator, and not to the global evaluator over a communication link, thereby reducing the amount of data being transferred between two subsystems. In addition, should the communication link fail, all local rules can still be implemented, since the watchdog checks are located at the same site.

For a rule qualified as global, the rule is passed to the global rule evaluator module, which receives all of the necessary watchdog check values from two or more different subsystems. The global rule is then evaluated. The global rule evaluator module is typically constituted by the rule evaluator module located within the monitoring agent at the point of control. In the preferred embodiment, the rule evaluator module 13 serves as the global rule evaluator module. In addition, the rule evaluator module 13 also serves as the rule evaluator for watchdog checks local to subsystem 10. However, depending on system loads and availability, the infobase agent 2 may configure a monitoring agent located at one of the managed systems (i.e., remotely located subsystem) as the global evaluator. The global evaluator will thus evaluate global rules and also rules which are local to the subsystem on which the global evaluator resides.

Figure 2A:
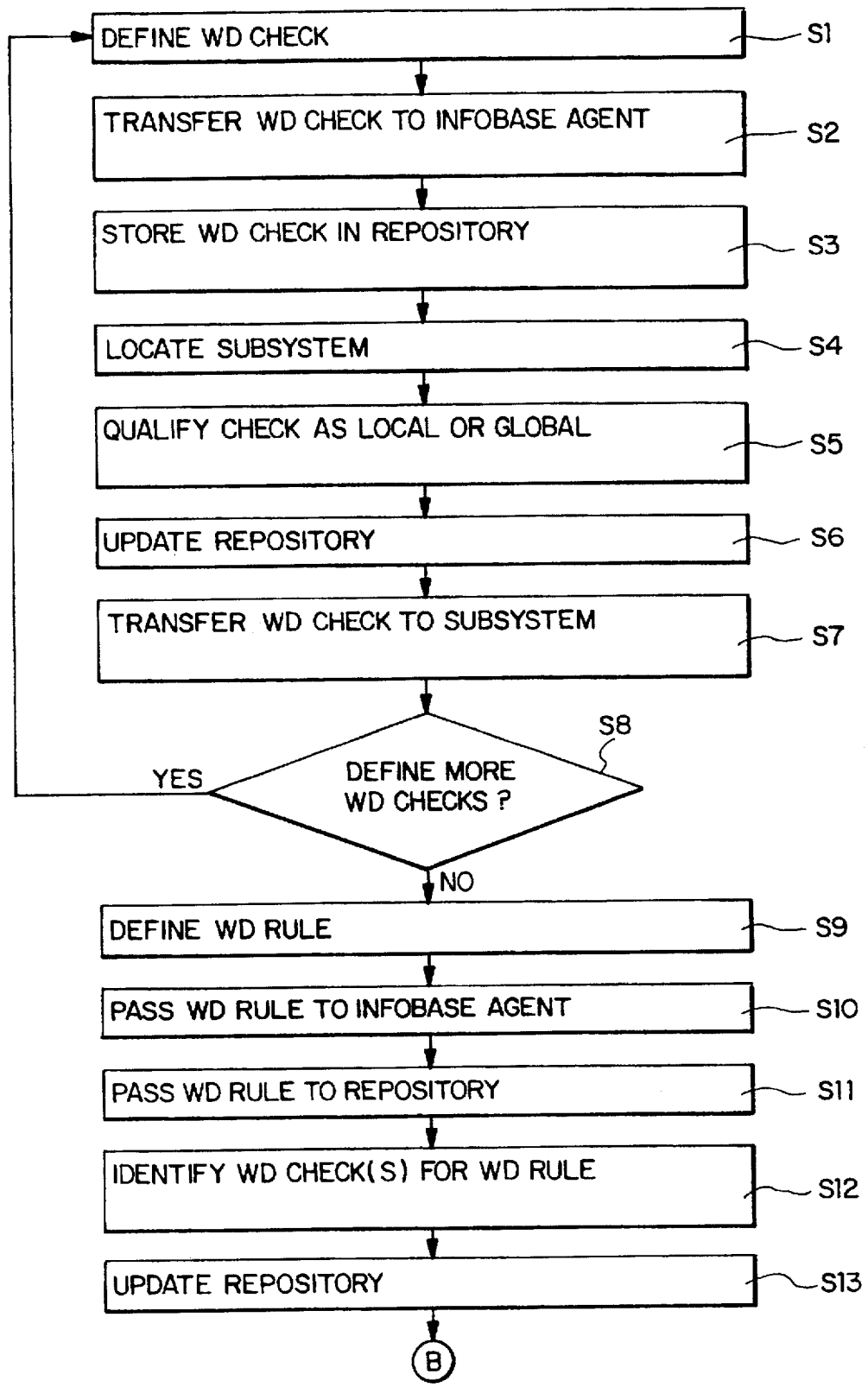
FIGS. 2a and 2b illustrate a flow chart representing operation of the computer system of FIG. 1 in accordance with the preferred embodiment of the present invention.

FIG. 2 illustrates a flow chart of the steps involved in programming the monitoring system in accordance with the present invention.

In step S1, the user or system administrator, via the interface application 1, defines a watchdog (WD) check for monitoring an entity. The check defined in step S1 is then transferred to the infobase agent 2 for processing at step S2, and stored in the repository 3 at step S3. In step S4, the infobase agent 2 locates the subsystem at which the entity to be monitored by the watchdog check exist. In step S5, the check is qualified as local or global. A local check is one that is utilized only by a local watchdog rule. On the other hand, a global check is one that is utilized by at least a global watchdog rule, and possibly a local watchdog rule as well. In step S6, the data repository is updated.

In step S7, the watchdog check is transferred to subsystem at which the entity exists. Next, a determination is made at step S8 as to whether additional watchdog checks are to be defined. If so, the process returns to step S1. Otherwise, the process proceeds to step S9.

Figure 2B:
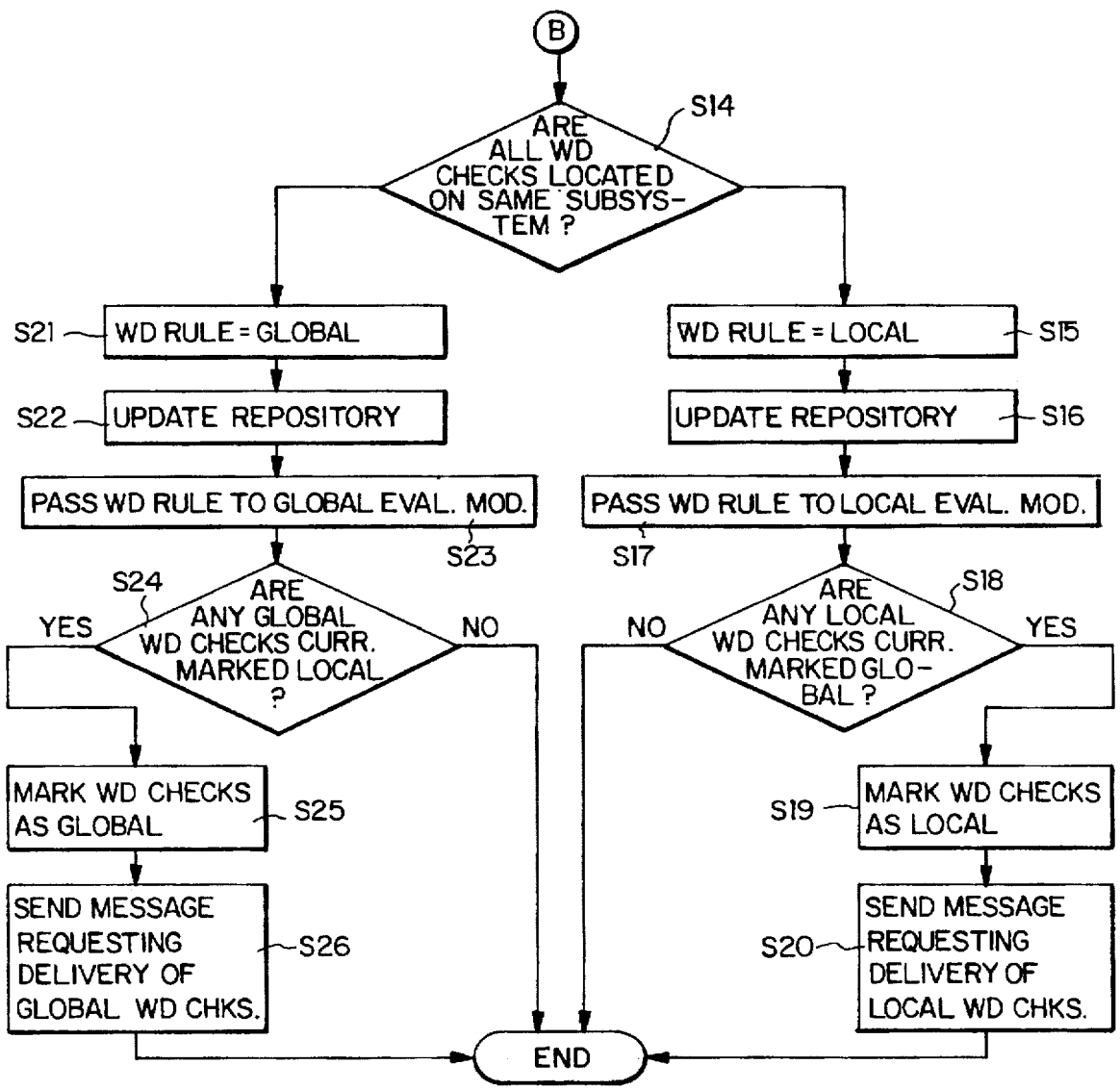

At step S9, the system administrator defines a watchdog rule. Next, in steps S10 and S11, the watchdog rule is passed to the infobase agent 2 for processing and to the repository 3 for storage, respectively. In step S12, the infobase agent 2 identifies the watchdog check or checks, which are required by the watchdog rule defined in step S9 for proper evaluation. In step S13, the data repository is updated to reflect the information pertaining to the newly defined rule. The process then proceeds to step S14 (FIG. 2b).

At step S14, a determination is made as to whether all of the identified checks are located at the same subsystem. This determination can be derived from the information stored in the data repository. If so, the process proceeds onto step S15. At step S15, the watchdog rule is qualified as local, and in step S16, the data repository is updated. In step S17, the watchdog rule is transferred to the rule evaluator module at the subsystem where the watchdog checks are located.

Next, in step S18, a determination is made as to where there is any watchdog check that is currently qualified as "global" but is no longer used by any global watchdog rule, because of recent changes to the monitoring system. This determination is made by the infobase agent by analyzing the information in the data repository. If no, the process ends. If yes, the process proceeds to step S19 where the data repository is updated to mark the watchdog checks, which are no longer used by global rules, as local checks. In step S20, a message is sent to the subsystem to instruct the subsystem that the newly marked checks need no longer be transferred to the global rule evaluator.

On the other hand, if, in step S14, the watchdog checks are not all located at the same subsystem, then, in step S21, the rule is qualified as global. The data repository is updated in step S22, and, in step S23, the watchdog rule is transferred to the global evaluator module. Next, in step S24, a determination is made, based on information stored in the data repository, as to whether any check that is currently marked as local, is now required to be marked as global. If no, the process ends. If yes, in step S25, the infobase agent updates the data repository to mark all of the checks, which are now required by global watchdog rules, as global. Finally, in step S26, a message is transferred to the appropriate subsystems to instruct the subsystems to begin delivery of the check values, which have just been marked as global, to the global rule evaluator.

To appreciate and understand more fully the present invention, the following illustrates in more detail the steps performed by a system administrator in order to monitor certain aspects of the computer system 100. The steps include:

1. The system administrator selects from the user interface 1 the icon designating the database ADB 27 of the subsystem 20 at the Managed System A.
2. The system administrator defines a first watchdog check value CHK#1 as a command returning the number of users (an integer value) of database ADB 27, with a filter specifying that only values greater than five should be evaluated. The check is scheduled to execute every 15 minutes.
3. The user interface 1 sends a message to the infobase agent 2 containing the complete definition of the new watchdog check CHK#1.
4. The infobase agent updates the data repository 3 by adding the new watchdog check CHK#1.
5. The infobase agent 2 locates the actual rule evaluation module and watchdog agent in charge of the watchdog check CHK#1, by deriving from topology information stored within the data repository 3 the subsystem on which the database ADB 27 runs.
6. The infobase agent 2 sends a message to the rule evaluation module 23, indicating that the new check CHK#1 returns integer values with an input filter of greater than five.
7. The infobase agent sends a message to the watchdog agent 24, indicating that the new check CHK#1 is to be executed every 15 minutes against the database ADB 27.
8. The watchdog agent 24 begins running the watchdog check CHK#1 as scheduled. The watchdog agent 24 generates a value and returns it to rule evaluation module 23, every 15 minutes.
9. The rule evaluation module 23 analyzes the returned value with the filter condition for each value it receives from the watchdog agent 24. If a value passes the filter (i.e., the value is greater than five), all rules using this check value will be evaluated. The rule evaluation module 23 also stores the check values locally as far as they are needed for rules evaluation or display at the user interface 1.
10. The system administrator selects from the user interface an icon representing Managed System A.
11. The system administrator defines a second watchdog check value CHK#2 as a command returning the current system load on Managed System A (a float value) with a filter specifying that only values greater than 1.5 should be evaluated; the check is scheduled to execute every 15 minutes.
12. The user interface 1 sends a message to the infobase agent 2 containing the complete definition of the newly defined check CHK#2.

13. The infobase agent 2 updates the data repository 3 by adding the new check CHK#2.
14. The infobase agent 2 locates the actual rule evaluation module and watchdog agent in charge of the second check CHK#2, based on topology information stored in the data repository 3.
15. The infobase agent sends a message to the rule evaluation module 23, indicating that the watchdog check CHK#2 will return float values with an input filter of greater than 1.5.
16. The infobase agent sends a message to the watchdog agent 25, indicating that the new check CHK#2 is to be executed every 15 minutes against the operating system AOS 26 of the subsystem 20 at Managed System A.
17. The watchdog agent 25 starts running the second check CHK#2 as scheduled, and generates a check value upon each execution of the check. The generated value is returned to the rule evaluation module 23.
18. The rule evaluation module 23 analyzes the returned value with the filter condition for each value it receives from the watchdog agent 25. If a value passes the filter (i.e., the value is greater than 1.5), all rules using this check value will be evaluated. The rule evaluation module 23 also stores the check values locally as far as they are needed for rules evaluation or display at the user interface 1.
19. The system administrator selects from the user interface 1, the previously defined watchdog checks CHK#1 and CHK#2 and defines a first watchdog rule RULE#1. The first rule RULE#1 is defined as:
IF: CHK#1>10 and CHK#2>3.0,
THEN: Disable logins on Managed System A.
That is, if there are already more than 10 users logged on and the system load gets critical then prohibit further logins.
20. The infobase agent 2 updates the data repository 3 by adding the newly defined watchdog rule RULE#1.
21. The infobase agent 2 analyzes the first rule RULE#1 and locates all the watchdog checks on which it depends. In this case all checks are located on subsystem 20 at the Managed System A, and therefore the first rule RULE#1 is qualified as being local. In addition, the action agent in charge of executing the specified actions in the rule is identified. In this case, the action is to be performed by the action agent 21. The infobase agent 2 then sends a message specifying the rule and action to the rule evaluator module 23.
22. The rule evaluator module 23 will now evaluate the first rule RULE#1 whenever new values for the first or second checks CHK#1 or CHK#2 arrive from one of the watchdog agents 24 or 25, respectively. If the rule condition evaluates to "true," the rule evaluator module 23 sends a message to the action agent 21, requesting that the action (i.e., prevent further logons) be performed.
23. The system administrator selects the icon designating the database BDB 37 residing on the subsystem 30 at the Managed System B.
24. The system administrator defines a third watchdog check CHK#3 as a command returning the number of users (an integer value) of the database BDB 37, with a filter specifying that only values greater than five should be evaluated. The watchdog check is scheduled to execute every 15 minutes.
25. The user interface 1 sends the complete definition of the newly defined check CHK#3 in the form of a message to the infobase agent.
26. The infobase agent 2 updates the data repository 3 by adding the newly defined watchdog CHK#3.
27. The infobase agent 2 locates the actual rule evaluation module and watchdog agent in charge of the third check CHK#3, based on topology information stored in the data repository 3 that database BDB runs on the subsystem at the Managed System B.
28. The infobase agent 2 sends a message to the rule evaluator module 33, indicating that the check CHK#3 will return integer values with an input filter of greater than five.
29. The infobase agent 2 sends a message to the watchdog agent 34 indicating that the new check CHK#3 is to be executed every 15 minutes against the database BDB 37.
30. The watchdog agent 34 begins running the third watchdog check CHK#3 as scheduled. The watchdog agent 34 will generate and return a value to the rule evaluation module 33.
31. The rule evaluation module 33 analyzes the returned value with the filter condition for each value it receives from the watchdog agent 34. If a value passes the filter (i.e., the value is greater than 5), all rules using this check value will be evaluated. The rule evaluation module 33 also stores the check values locally as far as they are needed for rules evaluation or display at the user interface 1.
32. The system administrator selects the first and third watchdog checks CHK#1 and CHK#3 from the user interface and defines a new watchdog rule RULE#2:
IF: CHK#1>CHK#3
THEN:
(1) Disable logons on Database ADB 27 on Managed System A; and
(2) Enable logons on database BDB 37 on Managed System B.
That is, if there are more database users logged onto the database ADB 27 than onto the database BDB 37, then direct further logons to the database BDB 37.
33. The infobase agent 2 updates the data repository 3 by adding the new watchdog rule RULE#2.
34. The infobase agent 2 analyzes the watchdog rule RULE#2 and locates all the watchdog checks that it will require. In this case, there is one check CHK#1 located on Managed System A, and one check CHK#3 located on Managed System B. Thus, this watchdog rule RULE#2 qualifies as being global. In addition, the infobase agent 2 identifies the action agents in charge of the specified actions defined by the rule RULE#2. In this case, the action is to be performed by the action agent modules 22 and 32. The infobase agent 2, based on data stored in the repository 3, indicates that the rule evaluation module in charge of evaluating global rule RULE#2 is the global evaluator 13, located at the subsystem 10 at the point of control C.
35. The infobase agent therefore sends a message specifying the rule to the rule evaluation module 13.
36. The infobase agent 2 also determines from the repository that the check value CHK#1 has only been used in local rules up to this point in time. Since it is now being used by the global rule RULE#2, the watchdog check values have to be made available at the global rule evaluator and action module of the monitoring agent 11. Thus, the infobase agent 2 sends a message to the rule evaluator 23, which is the local evaluation module for the check CHK#1, indicating that the watchdog check values for CHK#1 are also needed by the monitoring agent 11 at subsystem 10 at the point of control C.
37. The rule evaluator module 23 will send a message specifying the value of the first check CHK#1 to the global rule evaluator module 13, each time a value comes in from the watchdog agent 24 that passes the filter condition (values not passing the filter are not allowed to participate in rule evaluation).

38. The infobase agent 2 also determines from the repository that the check value CHK#3 has only been used in local rules up to this point in time. Since it is now being used by the global rule RULE#2, the watchdog check values have to be made available at the global rule evaluator and action module of the monitoring agent 11. Thus, the infobase agent 2 sends a message to the rule evaluator 33, which is the local evaluation module for the check CHK#3, indicating that the watchdog check values for CHK#3 are also needed by the monitoring agent 11 at subsystem 10 at the point of control C.

39. The rule evaluator module 33 will send a message specifying the value of the first check CHK#3 to the global rule evaluator module 13, each time a value comes in from the watchdog agent 34 that passes the filter condition (values not passing the filter are not allowed to participate in rule evaluation).

40. Whenever the global rule evaluator module 13 receives a value for either the check CHK#1 or CHK#3, it will evaluate the watchdog rule RULE#2. If the condition evaluates to "true," it will send a message specifying the action "disable database ADB logons" to the action module 22, and a message specifying the action "enable database BDB logons" to the action module 32.

41. The system administrator selects the watchdog check values CHK#1 and CHK#3 from the user interface 1, and defines a new watchdog rule RULE#3 as:

IF: CHK#3>CHK#1
THEN:
(1) Disable logons on database BDB 37 on Managed System B; and
(2) Enable logons on database ADB 27 on Managed System A.

That is, contrasted to step 32 above, if there are more database users logged onto the database BDB 37 than onto the database ADB 27, then direct further logons to the database ADB 27.

42. The infobase agent then updates the repository 3 by adding the new watchdog rule RULE#3.

43. The infobase agent 2 analyzes the watchdog rule RULE#3 and locates all the watchdog checks that it will require. In this case, there is one check CHK#1 located on Managed System A, and one check CHK#3 located on Managed System B. Thus, this watchdog rule RULE#3 qualifies as being global. In addition, the infobase agent 2 identifies the action agents in charge of the specified actions defined by the rule RULE#3. In this case, the action is to be performed by the action agent modules 22 and 32. The infobase agent 2, based on data stored in the repository 3, indicates that the rule evaluation module in charge of evaluating global rule RULE#3 is the global evaluator 13, located at the subsystem 10 at the point of control C.

44. The infobase agent therefore sends a message specifying the watchdog rule RULE#3 to the global rule evaluation module 13.

45. The infobase agent 2 detects that both of the watchdog checks CHK#1 and CHK#3 are already being sent to the global rule evaluator 13. Therefore, no further update messages to remote subsystems are necessary.

46. The global rule evaluator module 13 will now evaluate watchdog rule RULE#3, in addition to RULE#2.

By qualifying rules defined by the system administrator as being local or global, the present invention is capable of achieving a more balanced, evenly distributed and optimized monitoring system. That is, by providing for both local and global evaluation of rules, a centrally located subsystem need not have to perform all of the evaluations. Accordingly, the computer system as a whole is optimized. Moreover, less communications between the subsystem and centrally located subsystem are required, therefore making available more room for other necessary and higher priority data transfers. Furthermore, by more evenly distributing the monitoring tasks (i.e., the rule evaluations and transfers of watchdog check values), the amount of processing required by the centrally located subsystem is substantially reduced. In addition, if a failure occurs resulting in the central point of control not being able to communicate with the remote subsystems, the remote subsystems continue to monitor themselves.

There has thus been shown and described a novel architecture of a fully-automated, optimized and evenly distributed monitoring method and apparatus which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of monitoring a computer system having a plurality of subsystems, in which one of the subsystems is defined as a central subsystem and another one of the subsystems is defined as a managed subsystem, said method comprising the steps of defining a set of watchdog checks for monitoring said subsystems; defining one or more watchdog rules for evaluating at least one of said watchdog checks, each rule being based on a predetermined algorithm; and optimizing the processing of said watchdog rules based on the subsystems monitored by said watchdog checks which are evaluated by each of said watchdog rules.

2. A method of monitoring a computer system as defined by claim 1, wherein said step of defining a set of watchdog checks comprises the steps of defining, for each of said watchdog checks, the subsystem to monitor, and at least one of a filter value, check scheduling information, a command to execute, and whether to store values returned by said watchdog checks.

3. A method of monitoring a computer system as defined by claim 1, wherein said step of defining one or more watchdog rules comprises the steps of defining, for each of said watchdog rules, a set of conditions and one or more of said watchdog checks to evaluate against said set of conditions; and defining a first action to be carried out if said set of conditions is satisfied and a second action to be carried out if said set of conditions is not satisfied.

4. A method of monitoring a computer system as defined by claim 1, further comprising the step of identifying the subsystem each of said watchdog checks is defined to monitor and producing corresponding check identification information; and transferring each of said watchdog checks to the subsystem identified, based on said check identification information.

5. A method of monitoring a computer system as defined by claim 4, wherein said optimizing step comprises the steps of qualifying each of said watchdog rules as a global rule or local rule, based on said check identification information;

wherein a global rule is constituted by a watchdog rule that evaluates watchdog checks monitoring more than one subsystem, and a local rule is constituted by a watchdog rule that evaluates watchdog checks monitoring the same subsystem.

6. A method of monitoring a computer system as defined by claim 5, wherein said optimizing step further comprises the steps of qualifying each watchdog check as a global check or local check, wherein a global check is constituted by a watchdog check that is evaluated by a global watchdog rule, and a local check is constituted by a watchdog check that is evaluated by a local watchdog rule; said method further comprising the step of transferring a message to each of said subsystems indicating whether a watchdog check is qualified as a global check or local check.

7. A method of monitoring a computer system as defined by claim 6, further comprising the step of transferring all watchdog rules which are qualified as a global rule to a global rule evaluator; and transferring all watchdog rules which are qualified as a local rule to a local rule evaluator, wherein said global rule evaluator is located at one of said subsystems, and said local rule evaluator is located at the subsystem being monitored by the watchdog checks upon which the watchdog rule is based.

8. A method of monitoring a computer system as defined by claim 5, wherein said global rule evaluator is located at the central subsystem.

9. A method of monitoring a computer system as defined by claim 6, further comprising the steps of executing each of said watchdog checks at the subsystem each watchdog check is defined to monitor, and generating a check value for each of said watchdog checks, said check value being representative of the status of the subsystem being monitored by said watchdog check; and storing selected ones of said check values.

10. A method of monitoring a computer system as defined by claim 9, further comprising the steps of transferring each of said check values qualified as a local check to said local rule evaluator and transferring each of said check values qualified as a global check to said global rule evaluator and local rule evaluator; executing each of said watchdog rules based on at least one of said check values; and each of said watchdog rules initiating a predetermined action based on the evaluation of said at least one check value.

11. An apparatus for monitoring a computer system having a central subsystem and at least first and second remote subsystems, said apparatus comprising:
an interface unit for defining a plurality of watchdog checks to monitor one of said subsystems, and for defining a set of watchdog rules for evaluating a set of conditions against one or more of said plurality of watchdog rules; and
an infobase agent, coupled to said interface unit, for receiving and processing said plurality of watchdog checks and said set of watchdog rules, said infobase agent being operative to transfer each of the plurality of watchdog checks to the subsystem the watchdog check is defined to monitor, and to distribute each of said watchdog rules to one of said subsystems, based on the location of the watchdog checks which are evaluated by the watchdog rule.

12. An apparatus for monitoring a computer system as defined by claim 11, wherein each of said subsystems includes a monitoring agent comprising: one or more watchdog agents, each operative to execute one or more of said watchdog checks and to produce a corresponding check value; a local rule evaluator operative to execute one or more of said watchdog rules in response to one or more of said check values and to produce a corresponding result; and an action agent operative to carry out predetermined routines in response to said result, said monitoring agent being coupled to said infobase agent, and said apparatus further comprising a global rule evaluator located at one of said subsystems.

13. An apparatus for monitoring a computer system as defined by claim 12, wherein said infobase agent comprising means for qualifying each of said watchdog rules as a global rule or local rule, wherein a global rule is constituted by a watchdog rule that evaluates watchdog checks monitoring more than one subsystem, and a local rule is constituted by a watchdog rule that evaluates watchdog checks monitoring only one of the central subsystem, the first remote subsystem, and the second remote subsystem.

14. An apparatus for monitoring a computer system as defined by claim 13, wherein said infobase agent further comprising means for transferring each of the watchdog rules qualified as a global rule to the global rule evaluator, and for transferring each of the watchdog rules qualified as a local rule to the local rule evaluator of the subsystem the watchdog rule is defined to monitor.

15. An apparatus for monitoring a computer system as defined by claim 14, wherein said local rule evaluators at each of said remote subsystems comprise means for transferring check values generated by watchdog checks which are utilized by a global rule to said global rule evaluator for execution of the watchdog rules which are qualified as a global rule.

16. An apparatus for monitoring a computer system as defined by claim 11, further comprising a data repository, coupled to said infobase unit, for storing information concerning said computer system and said watchdog checks and rules.

17. An apparatus for monitoring a computer system as defined by claim 16, wherein said interface unit, infobase agent, and data repository are located as said central subsystem.

* * * * *